United States Patent
Hassan et al.

(10) Patent No.: US 10,853,609 B2
(45) Date of Patent: Dec. 1, 2020

(54) HYBRID TWO-DIMENSIONAL BARCODE READER

(71) Applicant: Microsoft Technology Licensing, LLC, Redmond, WA (US)

(72) Inventors: Amer Aref Hassan, Kirkland, WA (US); Whitney Janice Giaimo, Redmond, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/299,968

(22) Filed: Mar. 12, 2019

(65) Prior Publication Data

US 2020/0293733 A1    Sep. 17, 2020

(51) Int. Cl.
*G06K 7/10* (2006.01)
*G06K 7/14* (2006.01)

(52) U.S. Cl.
CPC .................. *G06K 7/1417* (2013.01)

(58) Field of Classification Search
CPC ............. G06K 7/1443; G06K 7/10722; G06K 19/06037; G06K 7/1417; G06K 7/1413; G06Q 50/22; G06Q 10/087; G06Q 10/10; G06Q 10/20; G04C 3/001; G04G 99/00; G06F 11/1012; G06F 16/00; G06F 16/2455; G06F 16/9554
See application file for complete search history.

(56) References Cited

U.S. PATENT DOCUMENTS

| | | | |
|---|---|---|---|
| 5,706,312 A | 1/1998 | Wei | |
| 6,176,429 B1 * | 1/2001 | Reddersen | G06K 7/10722 235/462.25 |
| 8,416,862 B2 | 4/2013 | Aldana et al. | |
| 10,158,612 B2 | 12/2018 | Xian et al. | |
| 2006/0093054 A1 | 5/2006 | Djokovic et al. | |

(Continued)

FOREIGN PATENT DOCUMENTS

EP    0763901 B1    11/2004

OTHER PUBLICATIONS

"What is a QR code", Retrieved From: https://delivr.com/faq/1323/what-is-a-qr-code, Retrieved Date: Dec. 28, 2018, 4 Pages.

(Continued)

*Primary Examiner* — Thien M Le
(74) *Attorney, Agent, or Firm* — Schwegman Lundberg & Woessner, P.A.

(57) ABSTRACT

A hybrid two-dimensional barcode reader decodes control features of the hybrid-two-dimensional barcode image, the control features corresponding to control features of a first formatting standard. The hybrid two-dimensional barcode reader extracts a data sequence from a data portion of the hybrid two-dimensional barcode image based on the decoded control features and a second data format different from a first data format of the first formatting standard to recover the first data set. The hybrid two-dimensional barcode reader may decode a second data set from the data portion of the two-dimensional barcode in the data encoding format of the first formatting standard. The hybrid two-dimensional barcode reader may also constellation decode the first data set.

22 Claims, 6 Drawing Sheets

(56) References Cited

U.S. PATENT DOCUMENTS

| | | | |
|---|---|---|---|
| 2007/0241196 A1 | 10/2007 | Yoon et al. | |
| 2009/0135946 A1 | 5/2009 | Dowling et al. | |
| 2010/0108769 A1* | 5/2010 | Wang | G06K 7/10722 235/472.01 |
| 2011/0072331 A1* | 3/2011 | Sakaue | G06F 11/1012 714/763 |
| 2011/0240740 A1* | 10/2011 | Li | G06K 7/1443 235/462.09 |
| 2012/0155579 A1 | 6/2012 | Zilberman et al. | |
| 2013/0082109 A1* | 4/2013 | Meier | G06K 7/10722 235/462.41 |
| 2014/0061310 A1 | 3/2014 | Narayanaswami et al. | |
| 2014/0209685 A1* | 7/2014 | Venkatesha | G06K 19/06131 235/462.04 |
| 2014/0247782 A1 | 9/2014 | Arambepola et al. | |
| 2015/0161496 A1 | 6/2015 | Rodriguez et al. | |
| 2015/0278753 A1* | 10/2015 | Hookom | G06Q 10/087 235/385 |
| 2015/0317060 A1 | 11/2015 | Debets et al. | |
| 2016/0171360 A1* | 6/2016 | Rettich | G06Q 10/20 235/494 |
| 2016/0267370 A1 | 9/2016 | Nishizaki | |
| 2017/0243097 A1* | 8/2017 | Loy | G06K 19/0614 |
| 2018/0107915 A1 | 4/2018 | Toedtli et al. | |
| 2020/0034590 A1* | 1/2020 | Howard | G06K 7/1417 |

OTHER PUBLICATIONS

"Non Final Office Action Issued in U.S. Appl. No. 16/299,898", dated May 31, 2019, 10 Pages.

Asok, et al., "QR Code Based Data Transmission in Mobile Devices Using AES Encryption", In Proceedings of International Journal of Science and Research, vol. 5, Issue 6, Jun. 2016, pp. 1116-1120.

Fath, et al., "Wireless Data Transmission Using Visual Codes", In Journal of Photonics Research, vol. 2, Issue 5, Oct. 1, 2014, 24 Pages.

Whitaker, Ben, "Connecting the Dots: An Introduction to 2D Barcodes", Retrieved From: http://www.masabi.com/2011/03/04/connecting-the-dots-an-introduction-to-2d-barcodes-3/, Mar. 4, 2011, 9 Pages.

"Notice of Allowance Issued in U.S. Appl. No. 16/299,898", dated Jan. 9, 2020, 9 Pages.

"International Search Report and Written Opinion Issued in PCT Application No. PCT/US2020/019563", dated May 12, 2020, 13 Pages.

"International Search Report and Written Opinion Issued in PCT Application No. PCT/US2020/021055", dated May 12, 2020, 12 Pages.

* cited by examiner

HYBRID TWO-DIMENSIONAL BARCODE READER

BACKGROUND

Two-dimensional bar codes, such as Quick response (QR) codes, Aztec codes, Data Matrix codes, Maxicodes, and PDF417 codes are widely used for accessing web sites, downloading personal information, posting information, accessing social networks, initiating phone calls, playing videos, routing packages, or viewing text documents. Each of these two-dimensional barcodes is governed by a respective standard that defines how data is encoded into the barcode so that the barcode may be decoded by compatible decoders. The popularity of these codes is due, at least in part to the availability of smart phones having cameras and resources such as web browsers through which a user may access content by merely scanning the two-dimensional barcode. This versatility makes two-dimensional barcodes a valuable tool in any industry that seeks to engage mobile users from printed materials. Two-dimensional barcodes, and in particular, QR codes, are ubiquitous.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

According to one aspect, a hybrid two-dimensional barcode reader decodes control features of the hybrid-two-dimensional barcode image, the control features corresponding to control features of a first formatting standard. The hybrid two-dimensional barcode reader extracts a data sequence from a data portion of the hybrid two-dimensional barcode image based on the decoded control features and a second data format different from a first data format of the first formatting standard to recover the first data set.

According to another aspect, the hybrid two-dimensional barcode reader decodes a second data set from the data portion of the two-dimensional barcode in the data encoding format of the first formatting standard.

According to yet another aspect, the hybrid two-dimensional barcode reader constellation decodes the first data set.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description when considered in conjunction with the drawings.

DETAILED DESCRIPTION

Figures 1A, 1B, 1C, 1D, 1E:
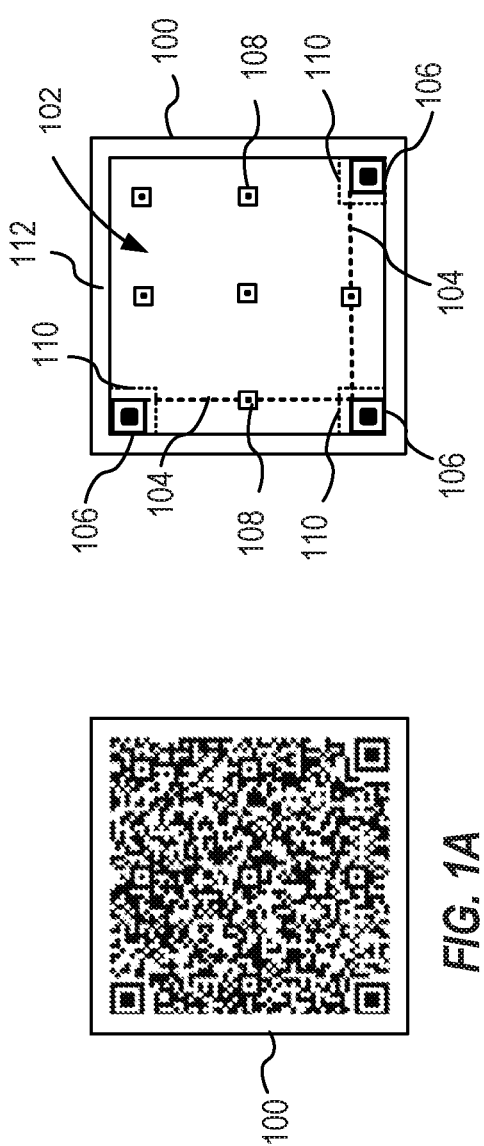
FIGS. 1A, 1C, 1D, and 1E show different two-dimensional barcodes.
FIG. 1B shows formatting information of an example QR code.

Many forms of two-dimensional barcodes are currently used to transmit data. It may be desirable, for example to generate a hybrid two-dimensional barcode including first and second data sets, where non-public data in the first data set may be used to authenticate the public data in the second data set. The data in the first data set may be data that the generator of the hybrid two-dimensional barcode wants to send to a recipient who has a compatible decoder/reader but be unreadable by a decoder that operates according to the technical standard governing the hybrid two-dimensional barcode. For example, the second data set in a hybrid two-dimensional barcode may identify a device to which the barcode is attached. This barcode may include a timestamp encoded as the second data set to thwart counterfeiters who may attach a copy of the barcode to their counterfeit part. One way to add non-public data to a barcode is to encrypt the data before encoding it. Encryption, however, may increase the size of the data and, thus, allow less data to be encoded in the two-dimensional barcode. In addition, encryption and decryption may require additional hardware and/or software in the two-dimensional barcode generator and two-dimensional barcode reader to encrypt and decrypt the non-public data. Furthermore, it may be desirable to send non-public data in a hybrid two-dimensional barcode that resembles a standard code but that can be decoded only by a hybrid two-dimensional barcode reader that is configured to access the non-public data. This encoded data may be read by anyone having a compatible hybrid two-dimensional barcode reader. Those having two-dimensional barcode readers that operate according to the corresponding technical standard, however, will not be able to read the non-public data.

Example embodiments below concern a method for generating a hybrid two-dimensional barcode including a first data set that cannot be decoded by a barcode reader operating according to the standard governing the two-dimensional barcode. The generated hybrid two-dimensional barcode holds more information than a conventionally encrypted barcode and may include only data in the first data set or a mix of data in the first and second data sets. The data in the second data set may be independent of the data in the first data set or may include information used to decode the data in the first data set. In some embodiments, the data first data set is encoded in the hybrid two-dimensional barcode having formatting elements of a standard two-dimensional barcode but using an encoding technique that is different from that specified in the standard governing the two-dimensional barcode. Thus, the example hybrid two-dimensional barcode resembles a barcode conforming to the standard but cannot be completely decoded using a standard decoder. Example hybrid two-dimensional barcodes conform to parts of the standard but do not conform to other parts. An example hybrid two-dimensional barcode decoded by a standard decoder may appear to be defective or appear to include less data than is actually encoded in the barcode. A hybrid two-dimensional barcode reader/decoder that is compatible with the example barcode, however, can recover the data in both the first and second data sets hybrid two-dimensional barcode.

Some example embodiments process the data in the first data set the hybrid two-dimensional barcode using a constellation encoder before encoding the processed data in the hybrid two-dimensional barcode. Furthermore, the constellation encoded data may be processed to be redundant, allowing some error correction in the decoding operation.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term. "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIGS. 1A through 1E show examples of four different types of two-dimensional barcode images. FIG. 1A shows an example Version 10 Quick Response (QR) barcode image 100 and FIG. 1B shows control features of the QR barcode image 100. FIG. 1C shows an example two-dimensional barcode image 120 according to an Aztec formatting standard, FIG. 1D shows an example two-dimensional barcode image 130 according to a Maxicode formatting standard, and FIG. 1D shows an example two-dimensional barcode image 140 according to a Data Matrix formatting standard. Each of these two-dimensional barcode images includes blocks of pixels representing control features and blocks of pixels representing data. In the described examples, control features are elements of the two-dimensional barcode image that allow a barcode reader to properly orient the barcode image, determine how data is encoded in the image, and/or extract individual data symbols from the image. The data may be encoded using an error correction code, such as a Reed Solomon code before being encoded in the two-dimensional barcode to enable the data to be recovered even when a portion of the two-dimensional barcode is corrupted. Although a single example of each of these codes is shown in FIGS. 1A and 1C-E, each type of barcode may have multiple different formats capable of holding respectively different amounts of data.

FIG. 1B shows features of the example QR barcode image 100 shown in FIG. 1A. The data for the QR barcode occupies most of the interior space (data area) 102 of the QR barcode. The data in this example barcode image are in the form of adjacent black and white blocks of pixels arranged in a first data format defined by the relevant QR code formatting standard. FIG. 1B shows the QR barcode 100 without the blocks of pixels corresponding to the data values. As shown in FIG. 1B the QR barcode 100 includes control features such as timing elements 104, position elements 106, alignment elements 108, version and format elements 110, and a quiet zone 112 surrounding the code. The timing elements define the horizontal and vertical bounds of the blocks of pixels. Each of these elements is encoded in the QR barcode image as a respective block of pixels in the QR code image.

The Aztec barcode 120, Maxicode barcode 130 and Data Matrix barcode 140 also include blocks of pixels representing control features and data elements, which are not described herein. Although the examples described below are in terms of the QR barcode image 100, it is contemplated that similar methods may be used to format the first data set in other types of two-dimensional barcode images including, without limitation, those shown in FIGS. 1C-1E by formatting the first data set in blocks of pixels that do not correspond to the formatting of the two-dimensional barcode while retaining the blocks of pixels corresponding to the format elements of the two-dimensional barcode. In addition, although the two-dimensional barcode images shown in FIGS. 1A through 1E include black and white blocks of pixels (e.g., squares or circles), it is contemplated that other barcodes including squares, circles, or other geometric shapes of different colors may be used in other embodiments. When more than two colors are used in a two-dimensional barcode image, each element of the barcode may represent more than one bit of information.

The example embodiments described below retain the timing elements 104, position elements 106, and alignment elements 108 of the standard two-dimensional barcode. At least a part of the data area 102 in these embodiments, however, is not encoded according to the QR formatting standard. Some example embodiments write data to the entire data area 102 by mapping binary data to black and white blocks of pixels such that a black block of pixels represents a "1" and a white block of pixels represents a "0" or vice versa. This differs from the encoding technique used in a standard QR barcode which applies a predetermined masking pattern to the data before writing it to the data area 102. Furthermore, the QR standard requires a specific layout of the encoded bits depending on the type of data being encoded, (e.g., numeric, alphanumeric, Kanji, or byte). Example embodiments described below do not mask the data and do not format the data according to the specific layouts of the QR standard. In other embodiments, the binary data is partitioned into successive sets of N bits, where N is a positive integer, and mapped into corresponding groups of N adjacent blocks of pixels (e.g., black and white squares) in the data area 102. In other embodiments, the N-bit data values are processed by a constellation encoder to map each N-bit value into a respective M-bit value, where M is an integer greater than N, and the M-bit values are mapped into the black and white blocks of pixels in the data area. To ensure that the data in the first data set can be decoded only by the example barcode reader, the constellation encoded data may be encrypted and data defining the constellation encoder and/or encryption keys may be encrypted and shared among the devices handling the QR codes including the first data set. In other embodiments, the data values may be redundantly mapped into the N-bit values to allow for error correction in the decoded data values. In yet other embodiments, the N-bit data values may be mapped into a predetermined portion of the data area 102 of an existing QR code so that the existing QR code may still be recovered by virtue of the Reed Solomon coding applied to the existing data and the data in the first data set may be recovered from the predetermined portion of the data area 102.

Figure 2:
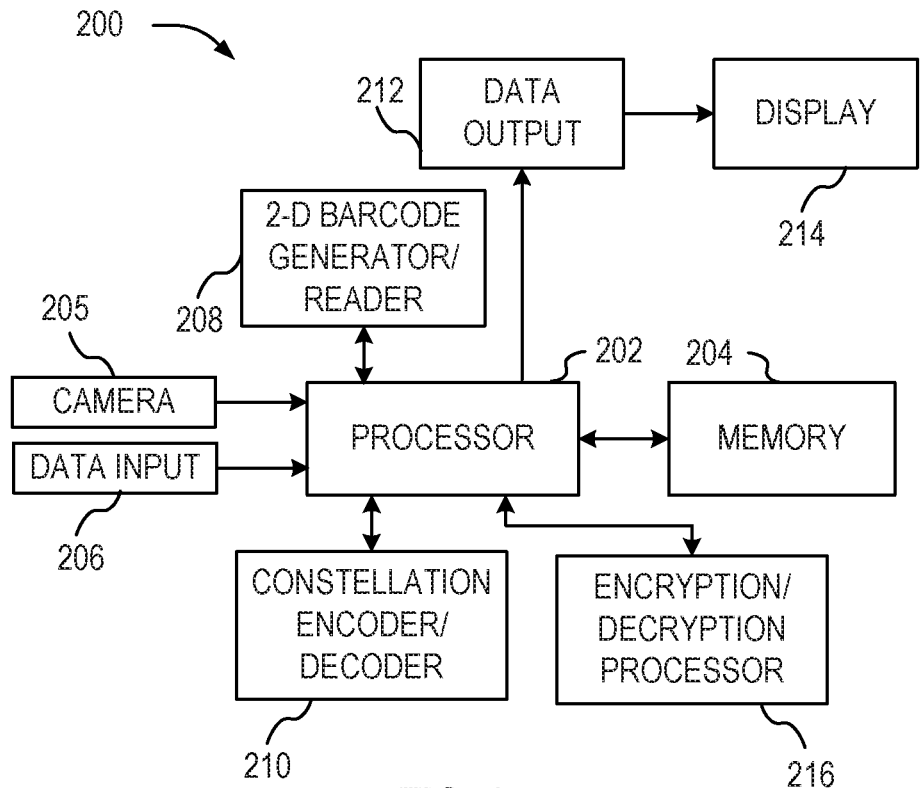
FIG. 2 is a block diagram of a hybrid two-dimensional barcode generator according to an example embodiment.

FIG. 2 is a block diagram of a hybrid two-dimensional barcode generator/reader device 200 according to an example embodiment. Although the device is described below as both a hybrid two-dimensional barcode generator and a hybrid two-dimensional barcode reader, a similar structure may be used as a hybrid two-dimensional barcode generator without the ability to read a two-dimensional barcode or as a hybrid two-dimensional barcode reader without the ability to generate a two-dimensional barcode. In addition, the device 200 may be used to generate two-dimensional barcodes according to the applicable standard, as the device 200 includes a standard two-dimensional barcode generator/reader. The example device 200 includes a processor 202, a memory 204, a camera 205, a data input device 206, a two-dimensional barcode generator/reader 208, an optional constellation encoder/decoder 210, an optional encryption/decryption processor 216, a data output device 212, an optional display device 214. The device 200 may be implemented using the hardware shown in FIG. 7, described below.

To generate a hybrid two-dimensional barcode, the processor 202 of the example device 200 receives the first data set via the data input device 206. The data input device may be a keyboard, a microphone coupled to a speech-to-text processor, a memory device, a wireless or wired network interface, or an interface to an application running on the device 200. The processor 202 stores the first data set in the memory 204. If the data in the first data set is to be processed for error correction (e.g., Reed Solomon Coding), the processor 202 performs this processing and stores the result in the memory 204. If the data in the first data set is to be constellation encoded and/or encrypted, the processor 202 applies data from the memory 204 to the optional constellation encoder/decoder 210 and/or encrypts the data in the first data set or the constellation encoded data using the encryption/decryption processor 216. When the first data set is not constellation encoded or encrypted, the processor 202 causes the two-dimensional barcode generator/reader 208 to generate a template barcode according to the applicable standard and then writes the first data set stored in the memory 204 to template. Alternatively, the processor 202 applies the data which has been constellation encoded and/or encrypted to the two-dimensional barcode generator/reader 208. In either case, the processor 202 then provides the generated hybrid two-dimensional barcode including the first data set to the data output device 212 for display on the optional display device 214. The encryption/decryption processor 216 may be used both to encrypt the first and/or second data sets before the data sets are written into the two-dimensional barcode and/or to encrypt and/or decrypt a constellation look-up table 400 used by the constellation encoder/decoder 210, as described below with reference to FIG. 4.

The operation of the hybrid two-dimensional barcode generator device 200 is described in more detail below with reference to FIG. 5. When the example device 200 is a hybrid two-dimensional barcode generator, the camera 205 may be eliminated and the constellation encoder/decoder 210 may be replaced by a constellation encoder 210. The two-dimensional barcode generator/reader may retain both functions to ensure that the second data set may be decoded from a hybrid two-dimensional barcode that includes both of the first and second data sets. Similarly, the encryption/decryption processor 216 may retain both functions so that the device 200 may encrypt the first and/or second data sets before generating the hybrid two-dimensional barcode and may decrypt the constellation look-up table 400 for use by the constellation encoder/decoder 210. In this instance, the device 200 may receive the decryption key and the encrypted constellation look-up table 400 via a data connection through the data input 206.

To read a hybrid two-dimensional barcode encoded according to the example embodiments, the processor 202 receives an image of the barcode from the camera 205 or from the data input device 206. The image received from the data input device 206 may be received, for example, from an application running on the device 200 or the device 700 shown in FIG. 7, from a wireless or wired network connection, or from a memory device. The processor passes the received image to the two-dimensional barcode generator/reader 208 to be decoded as described below with reference to FIG. 6. The two-dimensional barcode generator/reader 208 may interact with the constellation encoder/decoder to decode constellation encoded data from the hybrid two-dimensional barcode, as described below with reference to FIG. 4. The hybrid two-dimensional barcode may include data in the first and second data sets. The version and format elements 110 of the hybrid two-dimensional barcode include valid data when the barcode 100 includes data in the second data set. The second data set may include an indication that the hybrid two-dimensional barcode 100 also includes data. Alternatively, the version and format elements 110 may have values that can be read by the example device 200, indicating that the barcode includes only data in the first data set, a combination of data in the first and second data sets, or only data in the second data set. When the version and format elements 110 indicate that the hybrid two-dimensional barcode includes data in the second data set and the two-dimensional barcode generator/reader 208 is not able to decode the data in the second data set, the device 200 may provide output data indicating an error to the display device 214.

When the example device 200 is implemented as a hybrid two-dimensional barcode reader, the constellation encoder/decoder 210 may be replaced by a constellation decoder 210 and the two-dimensional barcode generator/reader may be replaced by a two-dimensional barcode reader. In an example reader device 200, the encryption/decryption processor 216 may be replaced by a decryption processor 216 to decrypt the first and/or second data sets in the hybrid two-dimensional barcode and/or to decrypt the constellation look-up table 400 for use by the constellation decoder 210. The decoder device 200 may receive the decryption key and the encrypted constellation look-up table 400 via a data connection through the data input 206.

Figure 3:
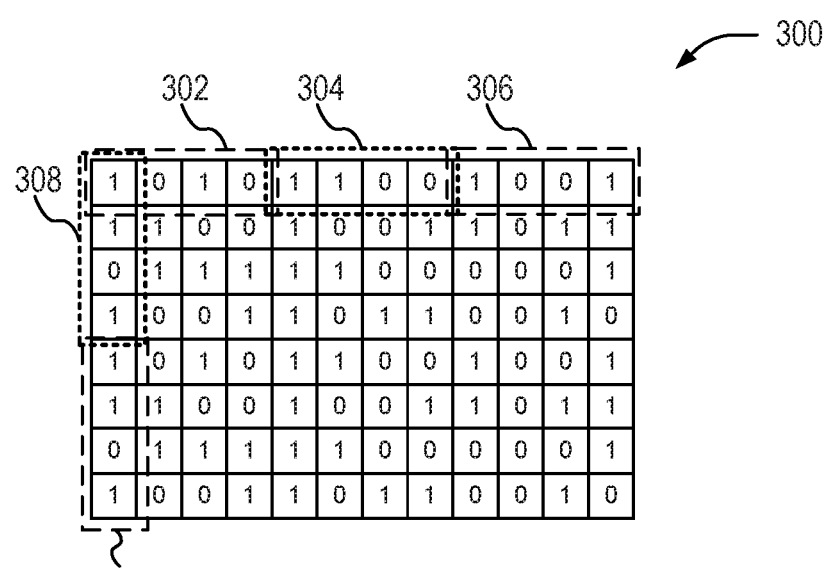
FIG. 3. is a data diagram showing a method for organizing data for encoding in a hybrid two-dimensional barcode according to an example embodiment.

FIG. 3 is a data diagram illustrating an example method for formatting data in the first data set to be included in the hybrid two-dimensional barcode. The example data in the first data set shown in FIG. 3 is arranged in the memory 204 in a two-dimensional matrix 300 having eight rows and 12 columns. The example method partitions the data along the rows and then along the columns into successive four-bit values that are formatted as black and white blocks of pixels in the example hybrid two-dimensional barcode. In this example, the first four bits of the first row form a first four-bit value 302 the next four bits form a second four-bit value 304 and the last four bits form a third four-bit value 306. This partitioning of the data continues for each row of the matrix 300. After partitioning the rows of the matrix to generate a sequence of 4-bit values, the processor 202 partitions the columns of the matrix to obtain another sequence of 4-bit values. These values are represented by the four-bit groupings 308 and 310 in FIG. 3. The values obtained from the partitioning of all of the rows and all of the columns of the matrix 300 may be encoded directly into the hybrid two-dimensional barcode or may be constellation encoded such that the results of the consolation encoding are encoded into the hybrid two-dimensional barcode.

To decode this data, an example decoder converts the blocks of pixels into a data sequence according to the data format of the first data set and divides the data sequence in half to provide first and second sub-sequences. Each sub-sequence is then used to regenerate a respective matrix of single-bit or multi-bit symbols such as the matrix shown in FIG. 3. For example, the first sub-sequence may be mapped into successive rows of a first matrix and the second sub-sequence may be mapped into successive columns of a second matrix. Any differences between the matrixes represent errors in the decoded data. Both decoded data sets may be presented to a user with the differences indicated so that the user may determine which version is correct for each error.

As an alternative to concatenating the sequences generated from the rows and columns, values from the sequences may be interleaved or combined in other ways such as reversing one sequence before interleaving it with the other sequence. As another alternative rather than generating sequences from rows and columns, the processor 202 may copy a sequence generated from scanning the rows of the matrix to generate two identical sequences and combine the sequences as described above to generate the data to be encoded in the hybrid two-dimensional barcode. While these examples describe encoding/decoding two identical sequences, an example system may encode three or more identical sequences. In this implementation, a voting system may be used in the decoder to determine which output value is correct when there are differences among the corresponding output values in the decoded sequences.

As yet another alternative to the formatting shown in FIG. 3 the processor may apply a conventional ECC algorithm such as Reed Solomon coding to the data before formatting the data in the hybrid two-dimensional barcode. Data encoded using any of these methods may be decoded by extracting the data sequence from the blocks of pixels and reversing the operations described above. The decoder applies the corresponding ECC decoder to recover the first data set from the decoded sequence. Any formatting used to encode successive data values into the hybrid two-dimensional barcode is shared between the encoder 200 and the decoder 200 so that data encoded in the format may be decoded. This information may be shared in the same way as the contents of the LUT, described below with reference to FIG. 4.

When the four-bit data values are encoded into the hybrid two-dimensional barcodes, they may be formatted as four linearly-arranged symbols (e.g., four blocks of pixels in a line) or as squares having two-blocks of pixels on a side. Longer sequences, larger squares, and/or rectangular arrangements of blocks of pixels may be used to encode values having larger numbers of bits.

Figure 4:
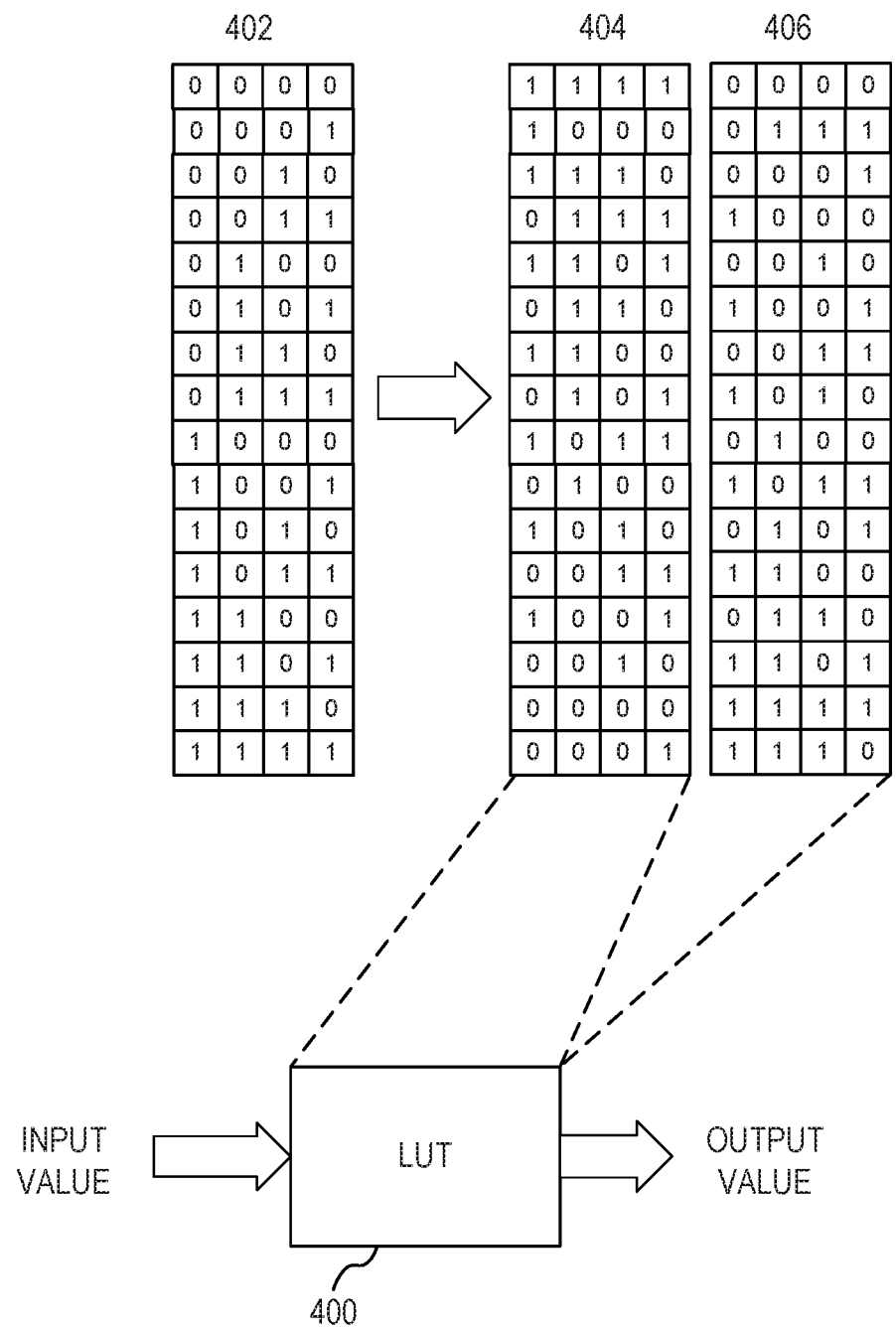
FIG. 4 is a data diagram, partly in block diagram form, illustrating a constellation encoder according to an example embodiment.

FIG. 4 is a data diagram, partly in block diagram form, that shows an example constellation encoder/decoder. In an example embodiment the encoder/decoder may be implemented as a lookup table (LUT) 400 which may be programmable. The values 402 represent the input values to the LUT 400 and the values 404 and 406 represent output values. The LUT 400 may be used as a constellation encoder or a constellation decoder. When used as an encoder, the values 402 represent the data to be encoded and the values 404 and 406 represent the encoded data. When used as a decoder, the values 402 represent the encoded data and the values 404 represent decoded data. The values 402 may be address values of the LUT. In a simple implementation, the LUT 400 may translate a four-bit input value into a four-bit output value that may be different from the four-bit input value. Thus, the example LUT 400 may contain values representing a permutation of the 16 four-bit input values. As there are 16! (20,922,789,888,000) different permutations of 16 values, the selection of a particular permutation for use in the LUT 400 may provide effective encryption when a different permutation is used for each hybrid two-dimensional barcode. The use of different permutations is illustrated by the values 406 which provide an alternative permutation of the input values 402.

Alternatively, when used as a constellation encoder, the LUT 400 may provide output values having a greater number of bits than the input values. For example, the values 404 and 406 may be concatenated such that each four-bit input value 402 corresponds to a respective 8-bit value provided by the LUT 400. Using permutations of 8-bit values to represent the first data set may provide even greater security than just the four-bit values 804 or 806. Conversely, when used as a decoder, the LUT 400 may translate input values having a greater number of bits into output values having a smaller number of bits, for example, translating the eight-bit values generated by the concatenation of the values 404 and 406 into the four-bit values 402.

As described below the particular permutation used in a hybrid two-dimensional barcode to encode the data in the first data set may be exchanged between a barcode generator 200 and a barcode reader 200 using an encrypted communication (e.g., a public key/private key encryption method). Alternatively, the values stored in the constellation translation LUT 400 may be generated using a generator function. The generator function may generate both values for the encoder LUT 400 and values for the decoder LUT 400. An example generator function pseudo randomly selects the 16 values responsive to a seed value that is exchanged by the encoder 200 and decoder 200 in an encrypted communication. As yet another alternative, this seed value or other value used by the generator function may be a common value stored in both the encoder 200 and the decoder 200. In one embodiment, the encoder 200 and decoder 200 may each store a number (e.g., 1 to 20) of seed values. The encoder 200 may randomly or pseudo randomly select one of these seed values to generate the constellation and the decoder 200 may sequentially step through the seed values, trying each one, until a verification code or ECC result indicates that the decoder 200 has successfully decoded the first data set.

Figure 5:
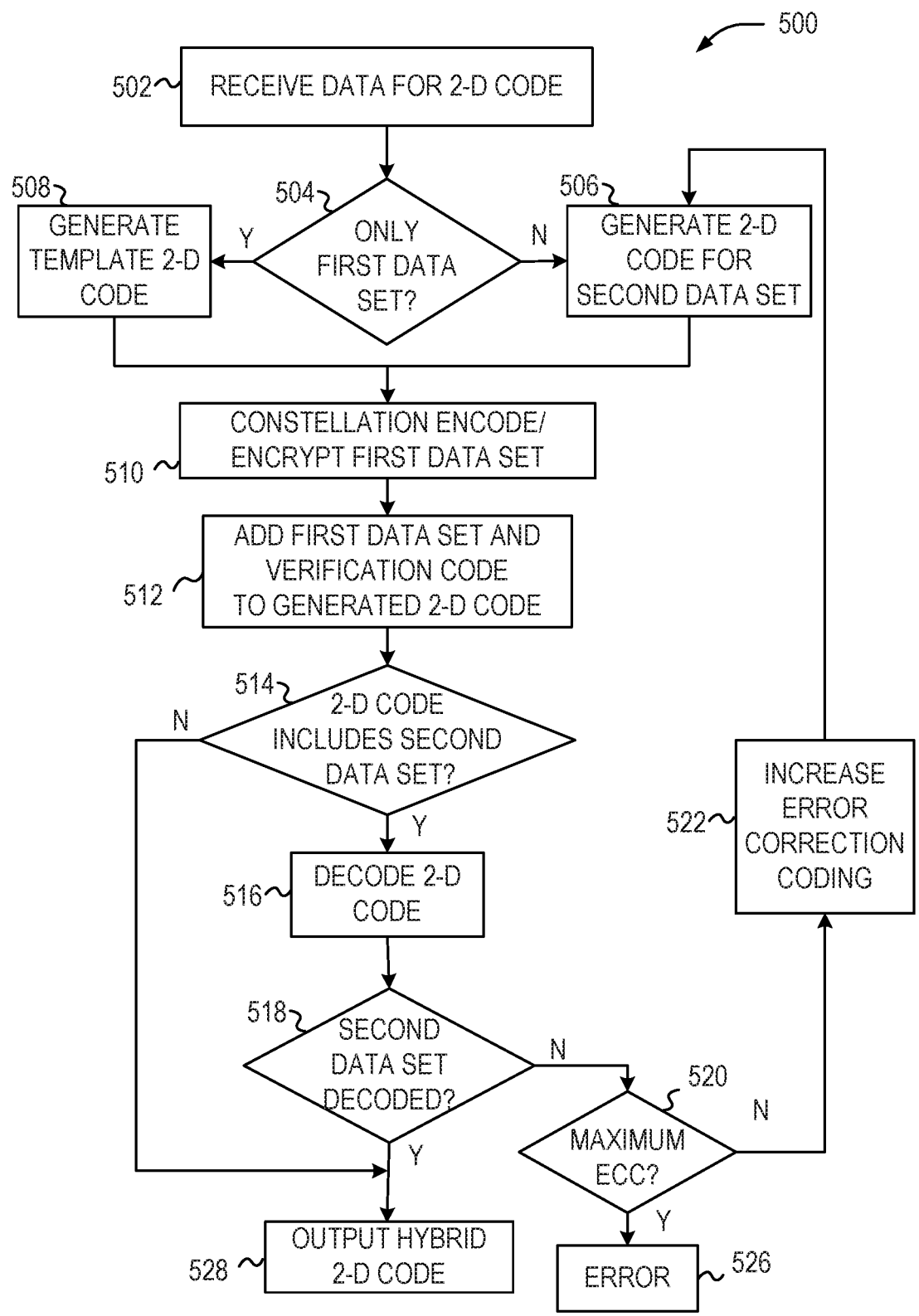
FIG. 5 is a flow-chart diagram of an example hybrid two-dimensional barcode generator according to an example embodiment.

FIG. 5 is a flowchart diagram showing an example process 500 for generating a hybrid two-dimensional barcode. At operation 502, the generator receives data for the hybrid two-dimensional barcode. The data may include both the first and second data sets or only the first data set. When operation 502 receives the second data set, the example process 500 generates a two-dimensional barcode including the data in the second data set according to the appropriate standard. The data in the first data set is then processed and used to replace a portion of the two-dimensional barcode image to generate the hybrid two-dimensional barcode image. Due to the ECC inherent in the two-dimensional barcode standard, a barcode reader operating according to the appropriate standard may still be able to read the second data set from the hybrid two-dimensional barcode. The standard may define different levels of ECC. For example, QR codes define four levels of ECC that allow between 7 percent and 30 percent of the corrupted data to be restored. Thus, the data in the first data set may replace a portion of the data in the second data set in a standard QR code and still allow the second data set to be recovered, depending on the amount of data in the second data set that was replaced by the first data set and the level of ECC that was applied to the second data set.

Operation 504 determines whether the received data includes data in both the first and second data sets. In this instance, operation 506 generates the two-dimensional barcode image for the data in the second data set according to the barcode standard. When operation 504 determines that the input data does not include data in the second data set, operation 508 generates an empty template for the hybrid two-dimensional barcode image. As described with reference to FIG. 1B above, this template may include the position 106, alignment 108, timing 104, and quiet zone 112 elements of the two-dimensional code. In some example embodiments, the template may also include version and format elements 110. After operation 506 or 508, process 500 executes operation 510 which constellation encodes and/or encrypts the data in the first data set. In addition, or in place of the constellation encoding described above, operation 510 may implement encryption including a symmetric key algorithm (e.g., AES, DES, 3DES, Blowfish, Twofish, or Serpent) or an asymmetric key algorithm (e.g., RSA, ElGamal, Elliptic Curve, or Diffie-Hellman).

After operation 510, the example encoder 500 adds the data in the first data set to the generated two-dimensional code (e.g., the code generated by operation 506 or 508) at operation 512. This data is added by replacing black and white blocks of pixels in a predetermined portion of the data area 102 of the two-dimensional barcode image 100, for example the blocks of pixels (e.g., squares) in the lower right corner of the data area 102, to generate the hybrid two-dimensional barcode image. This portion of the two-dimensional barcode is only an example. Because the data in the standard two-dimensional barcode is encoded with error correction, any portion of the barcode may be selected to include the data in the first data set. Both the encoder and decoder, however, use the same portion for the data in the first data set. Although the example above describes adding the first data set to a template two-dimensional barcode image, it is contemplated that the control elements of the standard two-dimensional barcode may, instead, be added to a two-dimensional barcode including the first data set. Alternatively, the hybrid two-dimensional barcode may be generated in a single operation in which the control elements and second data set are written into the hybrid two-dimensional barcode concurrently with writing the first data set.

Before formatting the first data set into the predetermined portion of the hybrid two-dimensional barcode, operation 512 may add one or more verification codes such as a checksum or cyclic redundancy code (CRC) to the data to aid in determining whether the data was properly decoded by a decoder. Embodiments employing ECC for the first data set may not use these verification codes. At operation 514 the process 500 determines whether the generated two-dimensional code includes data in the second data set. When the code includes data in the second data set, the process 500, at operation 516, decodes the hybrid two-dimensional barcode according to the appropriate standard. At operation 518, the process 500 determines whether the second data set has been recovered from the hybrid two-dimensional barcode. When operation 518 determines that the second data set has been recovered, or when operation 514 determines that the hybrid two-dimensional barcode does not include the second data set, operation 528 outputs the generated hybrid two-dimensional barcode.

When operation 518 determines that the second data set was not recovered, process 500 executes operation 520 to determine whether the second data set was encoded with the maximum ECC level. The standard for a two-dimensional barcode may include multiple levels of error correction coding and the level of coding used may be indicated in then version and format elements 110. QR codes, for example, include four levels of ECC. As described above, an example hybrid two-dimensional barcode having data in both the first and second data sets is implemented by replacing a predetermined portion of the data in the second data set (e.g., the data in the lower right corner of the QR code) with the data in the first data set. The decoding of this barcode relies on the ECC to recover the second data set. Thus, when the second data set was encoded using a relatively low level of ECC and the second data set cannot be recovered from the hybrid two-dimensional barcode, it may be possible to encode the second data set using a higher level of ECC to generate a hybrid two-dimensional barcode in which the second data set can be decoded even after replacing the predetermined portion of the barcode with the first data set.

Accordingly, when operation 520 determines that the maximum ECC level was not used to encode the second data set, operation 522 increases the level of the ECC and transfers control to operation 506 to regenerate the two-dimensional barcode including the second data set according to the standard. When operation 520 determines that the maximum ECC level was used to encode the second data set, and the second data set was not recovered from the hybrid two-dimensional barcode, operation 526 indicates that an error occurred in the generation of the hybrid two-dimensional barcode. In response to this error, the user may reduce the size of the second data set in the hybrid two-dimensional barcode or reduce the amount of data in the first data set to reduce the size of the predetermined portion of the standard two-dimensional barcode that is replaced by the first data set.

Figure 6:
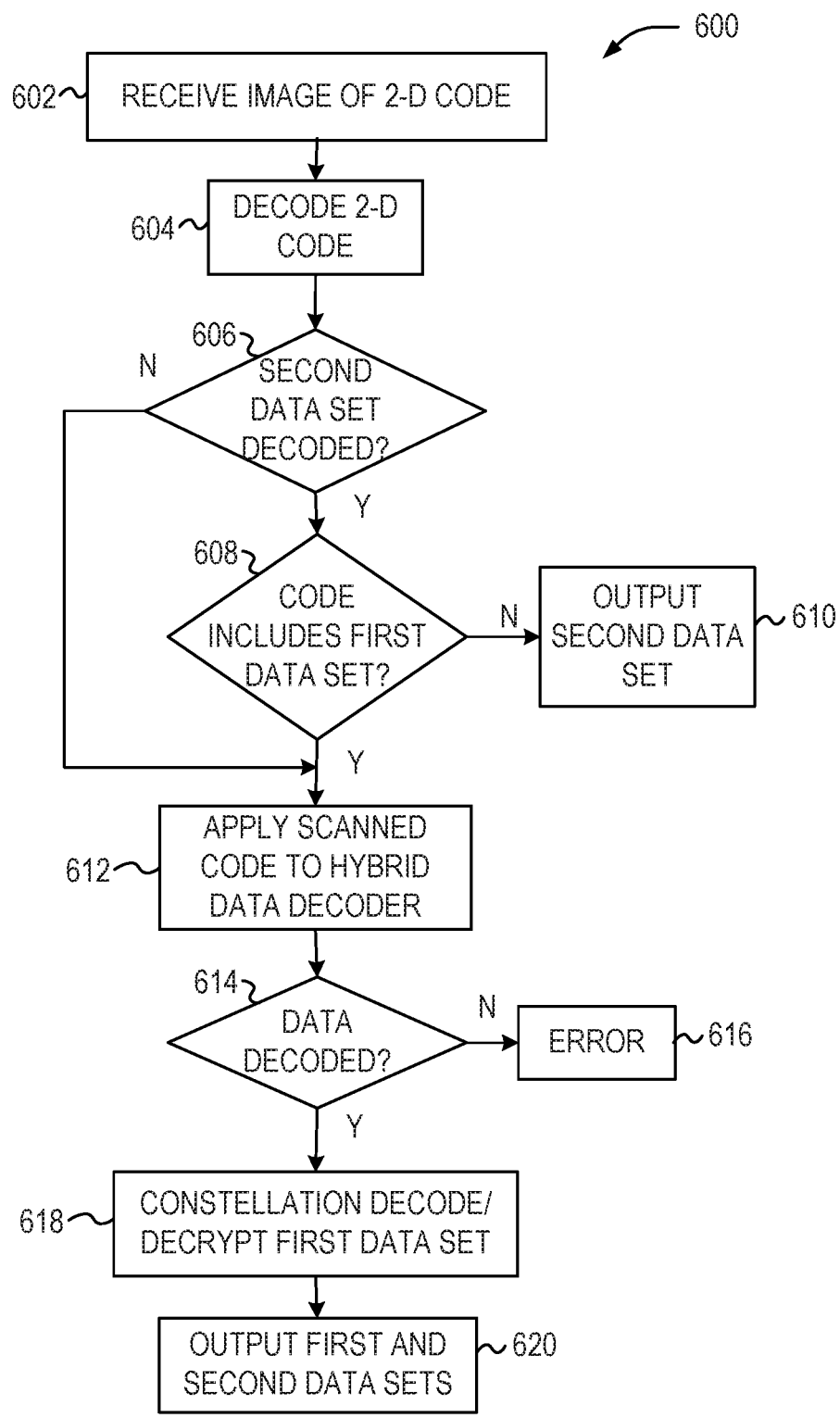
FIG. 6 is a flow-chart diagram of an example hybrid two-dimensional barcode reader according to an example embodiment.

FIG. 6 is a flowchart diagram of a decoding process 600 that may be performed by a device such as the device 200 shown in FIG. 2 and/or the device 700 shown in FIG. 7 below. At operation 602, the process 600 receives an image of the two-dimensional barcode. This image may be received, for example, via a camera, such as the camera 205 of the device 200 or the camera 810 of the device 800. At operation 604, the process 600 applies the received two-dimensional barcode 100 to a standard two-dimensional barcode decoder 208. An example standard barcode decoder 208 uses the timing elements 104 to identify blocks of pixels corresponding to the encoded data in the two-dimensional barcode. The identified blocks of pixels are translated into a sequence of bits or a sequence of multi-bit symbols according to the code format indicated by the formatting elements 110 of the two-dimensional barcode 100. Operation 606 determines from the output of operation 604 whether the decoder 208 was able to decode data in the second data set according to the standard. When operation 604 successfully decoded standard data, operation 608 determines whether the decoded data and/or whether the version and format elements 110 in the code 100 indicates that the two-dimensional barcode 100 is a hybrid two-dimensional barcode that also includes data in the first data set. When operation 608 determines that the two-dimensional barcode 100 does not include data in the first data set, the process 600 outputs the second data set as the result of decoding the two-dimensional barcode 100.

When operation 606 determines that no data was decoded by the standard two-dimensional decoder in operation 604 or when operation 608 determines that the barcode is a hybrid two-dimensional barcode including the data in both the first and second data sets, process 600 executes operation 612 which applies the hybrid two-dimensional barcode to the hybrid two-dimensional barcode decoder 200. The example decoder device 200 identifies and decodes the control features of the two-dimensional barcode according to the appropriate standard (e.g., the QR code standard, the Aztec code standard, the Data Matrix code standard, the Maxicode standard, or the PDF417 code standard). In an example using a hybrid QR code, the control features include the position elements 106 and alignment elements 106 and alignment elements 108 in the captured image and, based on these elements, identifies the timing elements 104.

Operation 612 then uses the timing elements to divide the data area 102 of the barcode 100 into blocks of pixels and converts each block of pixels into a bit or multi-bit symbol. The result is a generated sequence of values of the first data set from the hybrid two-dimensional barcode decoded in a format that does not correspond to the standard format used to decode the control features. In an example, the hybrid two-dimensional barcode includes only data in the first data set, the version and format elements 110 may specify how the blocks of pixels in the data area 102 of the hybrid two-dimensional barcode are to be translated into the output sequence. (e.g., how the data values are organized in the data area 102, what decryption code and/or constellation code to use, and/or what ECC code to use). Where the two-dimensional barcode includes data elements in the first and second sets, the version and format elements may describe only the data in the second data set. The format of the data in the first data set and boundaries for blocks of pixels in which it is encoded may be preprogrammed into the decoder 200. Alternatively, the decoder 200 may receive the format and boundary information of the sub-area in an encrypted communication including information about the constellation code, as described below, and/or may extract information about the sub-area from the second data set decoded in operation 604. Several examples of formats that may be used to encode/decode the first data set are described below.

Operation 614 determines whether the decoder operation 612 successfully decoded the first data set from the hybrid two-dimensional barcode. For example, operation 614 may generate a verification code such as a checksum and or a CRC from the generated data and compare the verification code to a corresponding verification code decoded by the data decoder operation 612. When the first data set is encoded with ECC, operation 614 may determine whether the data was decoded from the output of the ECC processor and may not generate or compare the verification code. When operation 614 determines that first data set was successfully decoded, operation 618 performs any constellation decoding and/or decryption operation that may have been applied to the data during generation of the hybrid two-dimensional barcode. While this example embodiment performs constellation decoding and/or decryption after verifying the data, it is contemplated that the verification operation 614 may occur after the extracted data has been processed by the constellation decoding and/or decryption operation 618.

In example embodiments an indication of whether the first data set is constellation coded and/or encrypted is contained in the version and format elements 110 of the two-dimensional code 100. The information used to decrypt the first data set, including the location of the predetermined portion of the hybrid two-dimensional barcode, the constellation used by the consolation encoder/decoder 210 and/or the encryption key used by the encryption/decryption processor 216 may be provided to the hybrid two-dimensional barcode encoder/decoder device 200 as encrypted data according to an agreed-upon encrypted messaging protocol using one of the encryption methods described above for optionally encrypting the first data set. After operation 618, operation 620 outputs both the first and second data sets.

Figure 7:
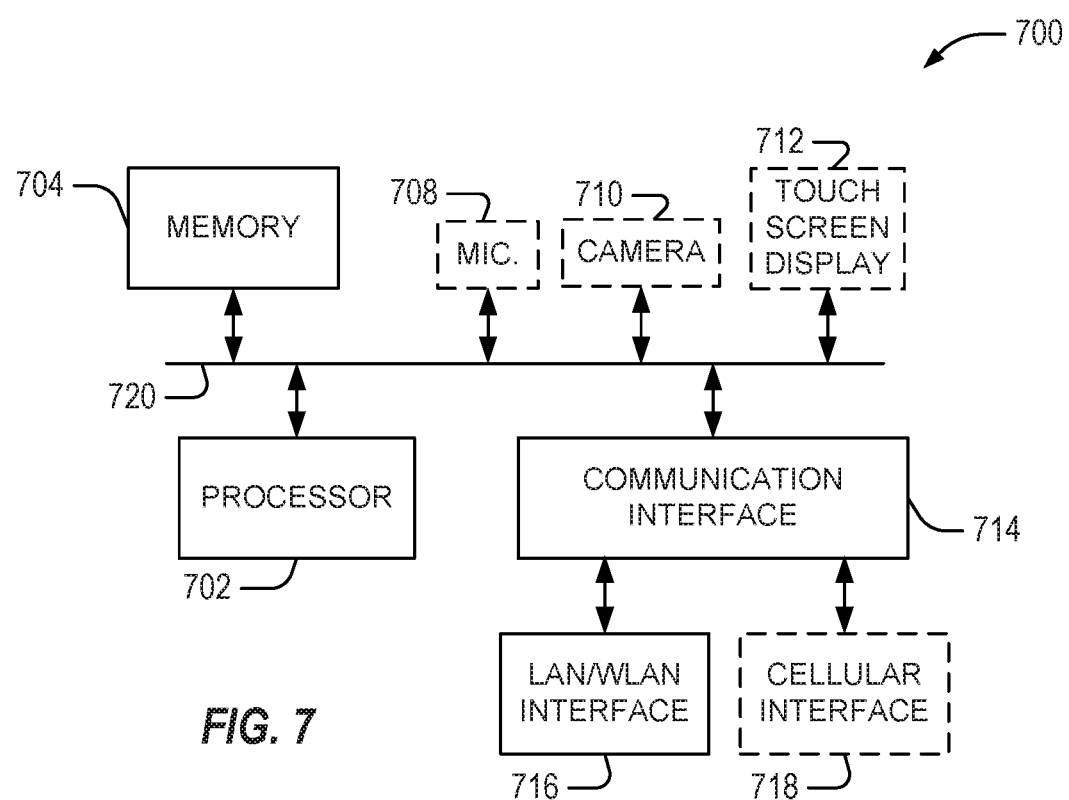
FIG. 7 is a block diagram of example hardware that may be used in an embodiment.

FIG. 7 is a block diagram of an example processing system 700 that may be used as two-dimensional barcode encoder/decoder device 200 shown in FIG. 2. The system 700 includes a processor 702 coupled to a bus 720. Also coupled to the bus 720 are a memory 704, which may include a flash memory device, random access memory (RAM) and/or read only memory (ROM); an optional microphone 708; an optional camera 710; and an optional input and/or output device 712, such as a touch screen display. The bus 720 also connects the system 700 to a communication interface 714, for example, to provide communication between the hybrid two-dimensional barcode encoder/decoder device 200, and a network (not shown) via an enhanced NodeB (not shown).

The memory 704 may store computer instructions for applications that are currently running on the system 700. The communications interface 714 may be coupled to a LAN/WLAN interface 716 such as a wired or optical Ethernet connection or wireless connection (e.g., IEEE 802.11 or IEEE 802.15). In addition, the communications interface 714 may be coupled to a wireless interface such as a cellular interface 718. The interfaces 716 and 718 may be coupled to respective transceivers and/or modems (not shown) to implement the data communications operations.

Processor 702 may include a microprocessor, microcontroller, digital signal processor (DSP) that is configured to execute commands stored in the memory 704 corresponding to the programs (Internet browsers, application program interfaces (APIs), dynamically linked libraries (DLLs), or applications (APPs)) such as one or more two-dimensional barcode encoder/decoder modules, or encryption/decryption modules. The memory 704 may also store temporary variables, a clipboard, or other information used in the execution of these programs. The programs stored in the memory 704 may be retrieved by the processor from a separate computer readable medium, for example, a flash memory device, a CD-ROM, or digital versatile disk (DVD).

EXAMPLES

Example 1 is an apparatus for decoding a first data set from a hybrid two-dimensional barcode image, the apparatus comprising: a processor; and a memory, coupled to the processor, the memory including instructions configuring the processor to: decode control features of the hybrid-two-dimensional barcode image, the control features corresponding to control features of a first formatting standard; and extract a data sequence from a data portion of the hybrid two-dimensional barcode image based on the decoded control features and a second data format different from a first data format of the first formatting standard to recover the first data set.

In Example 2, the subject matter of Example 1 includes, wherein the first formatting standard is selected from a group consisting of a QR barcode formatting standard, an Aztec barcode formatting standard, a Maxi barcode formatting standard, a Data Matrix barcode formatting standard, and a PDF417 barcode formatting standard.

In Example 3, the subject matter of Examples 1-2 includes, wherein the instructions further configure the processor to constellation decode the extracted data sequence to recover the first data set.

In Example 4, the subject matter of Example 3 includes, wherein the instructions that configure the processor to constellation decode the first data set configure the processor to: partition the data sequence into successive N-bit data values, where N is an integer; and apply the successive N-bit data values as address values to a constellation translation look-up table, to recover the first data set as successive output values of the constellation translation look-up table.

In Example 5, the subject matter of Example 4 includes, wherein the constellation translation look-up table is configured to generate Q-bit output values as the constellation encoded data, where Q is an integer less than N.

In Example 6, the subject matter of Examples 4-5 includes, wherein the instructions further configure the processor to: receive encrypted data representing the constellation translation look-up table; and decrypt the encrypted data representing the constellation translation look-up table to generate the constellation translation look-up table before constellation decoding the first data set.

In Example 7, the subject matter of Example 6 includes, wherein the instructions further configure the processor to decrypt the encrypted data representing constellation translation look-up table according to an asymmetric decryption algorithm.

In Example 8, the subject matter of Examples 4-7 includes, wherein the instructions that configure the processor to divide the data sequence into successive N-bit data values include instructions that configure the processor to: divide the data sequence into first and second sub-sequences of values; arrange the first sub-sequence of values as a first matrix having M rows and P columns, where M and P are integers greater than N, by mapping successive N-bit values of the first sub-sequence along the rows of first matrix; arrange the second sub-sequence of values as a second matrix having M rows and P columns by mapping successive N-bit values of the second sub-sequence along the columns of second matrix; and identify differences between the first and second matrixes as errors in the decoded first data set.

In Example 9, the subject matter of Examples 1-8 includes, instructions that configure the processor to: partition the data portion of the hybrid two-dimensional barcode image into respective sub-matrixes of pixel blocks, each sub-matrix including N pixel blocks and having at least two rows and two columns; and decode the respective N-pixel blocks into the successive N-bit values of the data sequence.

In Example 10, the subject matter of Examples 1-9 includes, instructions that configure the processor to: decode the hybrid two-dimensional barcode image including instructions that configure the processor to: decode the control features corresponding to the control features of the first formatting standard, extract the first data set from the data portion of the hybrid two-dimensional barcode image based on the decoded control features and the second data format, and extract a second data set in the data portion of the hybrid two-dimensional barcode image based on the decoded control features and the first data format of the first formatting standard.

Example 11 is a method for decoding a first data set in a hybrid two-dimensional barcode image, the method comprising: decoding control features of the hybrid two-dimensional barcode image, the control features corresponding to control features of a first formatting standard; and extracting a data sequence from a data portion of the hybrid two-dimensional barcode image based on the decoded control features and a second data format different from a first data format of the first formatting standard to recover the first data set.

In Example 12, the subject matter of Example 11 includes, constellation decoding the data sequence to recover the first data set.

In Example 13, the subject matter of Example 12 includes, wherein the constellation decoding of the data sequence comprises: partitioning the data sequence into successive N-bit data values, where N is an integer; and applying the successive N-bit data values as address values to a constellation translation look-up table to recover the first data set as successive output values of the constellation translation look-up table.

In Example 14, the subject matter of Example 13 includes, wherein constellation decoding of the data sequence includes generating Q-bit output values as the constellation encoded data, where Q is an integer less than N.

In Example 15, the subject matter of Examples 13-14 includes, receiving encrypted data representing the constellation translation look-up table; and decrypting the encrypted data representing the constellation translation look-up table to generate the constellation translation look-up table before constellation decoding the first data set.

In Example 16, the subject matter of Example 15 includes, decrypting the encrypted data representing the constellation look-up table according to an asymmetric decryption algorithm.

In Example 17, the subject matter of Examples 13-16 includes, dividing the data sequence into first and second sub-sequences of successive N-bit values; arranging the first sub-sequence of N-bit values as a first matrix having M rows and P columns, where M and P are integers greater than N, by mapping the successive N-bit values of the first sub-sequence along the rows of first matrix; arranging the second sub-sequence of values as a second matrix having M rows and P columns by mapping the successive N-bit values of the second sub-sequence along the columns of second matrix; and identifying differences between the first and second matrixes as errors in the decoded first data set.

In Example 18, the subject matter of Examples 11-17 includes, partitioning the data portion of the hybrid two-dimensional barcode image into respective sub-matrixes of pixel blocks, each submatrix including N pixel blocks having at least two rows and two columns; decoding the respective N-pixel blocks into successive N-bit values of the data sequence.

In Example 19, the subject matter of Examples 11-18 includes, decoding the control features corresponding to the control features of the first formatting standard, extracting the first data set from the data portion of the hybrid two-dimensional barcode image based on the decoded control features and the second data format, and extracting a second data set in the data portion of the hybrid two-dimensional barcode image based on the decoded control features and the first data format of the first formatting standard.

Example 20 is an apparatus for decoding a first data set in a hybrid two-dimensional barcode image, the apparatus comprising: means for decoding control features of the hybrid two-dimensional barcode image, the control features corresponding to control features of a first formatting standard, and means for extracting a data sequence from a data portion of the hybrid two-dimensional barcode image based on the decoded control features and a second data format different from a first data format of the first formatting standard to recover the first data set.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An apparatus for extracting a data sequence from a hybrid two-dimensional barcode image, the hybrid two-dimensional barcode image having first blocks of pixels, corresponding to control features of a first two-dimensional barcode format, and second blocks of pixels in a data format different from one or more data formats of the first two-dimensional barcode format, the apparatus comprising:
   a processor; and
   a memory, coupled to the processor, the memory including instructions, upon execution by the processor, configuring the apparatus to:
   decode the first blocks of pixels to obtain control features of the hybrid two-dimensional barcode image according to the first two-dimensional barcode format;
   determine, from the obtained control features, a value indicating the data format of the second blocks of pixels wherein the value indicating the data format of the second blocks of pixels is not a valid data format value of the first two-dimensional barcode format; and
   extract the data sequence from the second blocks of pixels according to the data format of the second blocks of pixels.

2. The apparatus of claim 1, wherein the first two-dimensional barcode format is selected from a group consisting of a QR barcode format, an Aztec barcode format, a Maxi barcode format, a Data Matrix barcode format, and a PDF417 barcode format.

3. The apparatus of claim 1, wherein the instructions further configure the apparatus to constellation decode the data sequence to recover a first data set.

4. The apparatus of claim 3, wherein the instructions that configure the apparatus to constellation decode the data sequence configure the apparatus to:
   partition the data sequence into successive N-bit data values, where N is an integer; and
   apply the successive N-bit data values as address values to a constellation translation look-up table, to recover the first data set as successive output values of the constellation translation look-up table.

5. The apparatus of claim 4 wherein the constellation translation look-up table is configured to generate Q-bit output values as the constellation decoded data, where Q is an integer less than N.

6. The apparatus of claim 4, wherein the instructions further configure the apparatus to:
   receive encrypted data representing the constellation translation look-up table; and
   decrypt the encrypted data representing the constellation translation look-up table to generate the constellation translation look-up table before constellation decoding the first data set.

7. The apparatus of claim 6, wherein the instructions further configure the apparatus to decrypt the encrypted data representing constellation translation look-up table according to an asymmetric decryption algorithm.

8. The apparatus of claim 4, wherein the instructions that configure the apparatus to divide the data sequence into successive N-bit data values include instructions that configure the apparatus to:
   divide the data sequence into first and second sub-sequences of values;
   arrange the first sub-sequence of values as a first matrix having M rows and P columns, where M and P are integers greater than N, by mapping successive N-bit values of the first sub-sequence along the rows of first matrix;
   arrange the second sub-sequence of values as a second matrix having M rows and P columns by mapping successive N-bit values of the second sub-sequence along the columns of second matrix; and
   identify differences between the first and second matrixes as errors in the first data set.

9. The apparatus of claim 1, further comprising instructions that configure the apparatus to:
   partition the second blocks of pixels into respective sub-matrixes of pixel blocks, each sub-matrix including N pixel blocks and having at least two rows and two columns; and
   decode respective ones of the N pixel blocks into successive N-bit values of the data sequence.

10. The apparatus of claim 1, wherein the hybrid two-dimensional barcode image includes third blocks of pixels, corresponding to further control features of the first two-dimensional barcode format and fourth blocks of pixels in one of the one or more data formats of the first two-dimensional barcode format,
   the memory comprising further instructions that configure the apparatus to:
   decode the third blocks of pixels to obtain further control features of the hybrid two-dimensional barcode image;
   determine that the further control features correspond to a valid data format of the first two-dimensional barcode format;
   and
   extract a further data sequence from the fourth blocks of pixels in the hybrid two-dimensional barcode image according to the valid data format.

11. The apparatus of claim 10, comprising instructions that configure the apparatus to authenticate the data sequence extracted from the second blocks of pixels based on data in the further data sequence.

12. A method for extracting a data sequence from a hybrid two-dimensional barcode image, the hybrid two-dimensional barcode image having first blocks of pixels corresponding to control features of a first two-dimensional barcode format, and second blocks of pixels in an data format different from one or more data formats of the first two-dimensional barcode format, the method comprising:
   decoding the first blocks of pixels to obtain control features of the hybrid two-dimensional barcode image according to the first two-dimensional barcode format;
   determining, from the obtained control features, a value indicating the data format of the second blocks of pixels wherein the value indicating the data format of the second blocks of pixels is not a valid data format value of the first two-dimensional barcode format; and
   extracting the data sequence from the second blocks of pixels according to the data format of the second blocks of pixels.

13. The method of claim 12, further comprising constellation decoding the data sequence to recover a first data set.

14. The method of claim 13, wherein the constellation decoding of the data sequence comprises:
   partitioning the data sequence into successive N-bit data values, where N is an integer; and
   applying the successive N-bit data values as address values to a constellation translation look-up table to recover the first data set as successive output values of the constellation translation look-up table.

15. The method of claim 14 wherein constellation decoding of the data sequence includes generating Q-bit output values as the constellation decoded data, where Q is an integer less than N.

16. The method of claim 14, further comprising:
receiving encrypted data representing the constellation translation look-up table; and
decrypting the encrypted data representing the constellation translation look-up table to generate the constellation translation look-up table before constellation decoding the first data set.

17. The method of claim 16, including decrypting the encrypted data representing the constellation translation look-up table according to an asymmetric decryption algorithm.

18. The method of claim 14, further comprising:
dividing the data sequence into first and second subsequences of successive N-bit values;
arranging the first sub-sequence of N-bit values as a first matrix having M rows and P columns, where M and P are integers greater than N, by mapping the successive N-bit values of the first sub-sequence along the rows of first matrix;
arranging the second sub-sequence of values as a second matrix having M rows and P columns by mapping the successive N-bit values of the second sub-sequence along the columns of second matrix; and
identifying differences between the first and second matrixes as errors in the first data set.

19. The method of claim 12, further comprising:
partitioning the second blocks of pixels into respective sub-matrixes of pixel blocks, each submatrix including N pixel blocks having at least two rows and two columns;
decoding respective ones of the N pixel blocks into successive N-bit values of the data sequence.

20. The method of claim 12, wherein the hybrid two-dimensional barcode image includes third blocks of pixels, corresponding to further control features of the first two-dimensional barcode format and fourth blocks of pixels in one of the one or more data formats of the first two-dimensional barcode format, the method further comprising:
decoding the third blocks of pixels to obtain further control features of the hybrid two-dimensional barcode image;
determining that the further control features correspond to a valid data format of the first two-dimensional barcode format, and
extracting a further data sequence from the fourth blocks of pixels in the hybrid two-dimensional barcode image according to the valid data format.

21. The method of claim 20, further comprising authenticating the data sequence extracted from the second blocks of pixels based on data in the further data sequence.

22. An apparatus for extracting a data sequence from a hybrid two-dimensional barcode image, the hybrid two-dimensional barcode image having first blocks of pixels corresponding to control features of a first two-dimensional barcode format, and second blocks of pixels in an data format different from one or more data formats of the first two-dimensional barcode format, the apparatus comprising:
means for decoding the first blocks of pixels to obtain control features of the hybrid two-dimensional barcode image according to the first two-dimensional barcode format,
means for determining, from the obtained control features, a value indicating the data format of the second blocks of pixels wherein the value indicating the data format of the second blocks of pixels is not a valid data format value of the first two-dimensional barcode format, and
means for extracting the data sequence from the second blocks of pixels according to the data format of the second blocks of pixels.

* * * * *